3,816,584
ASYMMETRICAL TRANSVERSE STRETCHING OF
PLASTIC FILM
Willi Johann Schmidt, Hahn, Taunus, Germany, assignor
to Kalle Aktiengesellschaft, Wiesbaden-Biebrich, Germany
Filed Mar. 2, 1972, Ser. No. 231,246
Claims priority, application Germany, Mar. 5, 1971,
P 21 10 625.2
Int. Cl. B29d 7/24
U.S. Cl. 264—289      7 Claims

ABSTRACT OF THE DISCLOSURE

In the transverse stretching of webs of plastic film, in which the edges of the film are continuously held by holding elements while the web is being moved longitudinally, the distribution of flow lines is improved and the differences in thickness within the web are reduced, by asynchronously transversely stretching the web as by causing divergence of first one and then the other edge of the film relative to the direction of longitudinal movement. Preferably the respective divergences are geometrically identical, and/or are periodically displaced in the direction of the longitudinal axis and/or of the transverse axis of the web. The invention may be applied in multi-stage stretching processes and also in simultaneous transverse/longitudinal stretching processes.

BACKGROUND OF THE INVENTION

1. Field of the invention

This invention is concerned with a process for the transverse stretching of webs of plastic film, by which the distribution of flow lines is improved as well as the absolute differences in thickness within the web are reduced.

2. Description of the prior art

It has not hitherto been possible in the manufacture of flat sheets by extrusion to avoid the formation of thicker areas caused by differences in the flow behaviour of the melt during extrusion, nor can such thicker areas be removed from the unstretched or stretched films. These thicker areas, which are always in the same position, are particularly annoying in the end products, especially when thin films of, e.g., less than $50\mu$ thickness are to be wound up. When webs of stretched or unstretched film are wound up, thick bulges become apparent which are caused by the superimposed thicker areas of the film. The web of film becomes distorted in the region of the bulges, especially when it is wound up or stored, thus causing a further substantial deterioration of the flat quality of the film. Also when the films are to be further processed, e.g. printed or laminated, such areas of increased or reduced thickness extending in the longitudinal direction of the film are very troublesome.

For these reasons, numerous attempts have been made to influence the melt during extrusion in order to reduce the differences in thickness and to distribute them transversely to the direction of extrusion. These attempts have shown that, although the differences in thickness of the web can be reduced by certain measures, e.g. by zone-wise adjustment of the die slot, they cannot be altogether avoided. Therefore, it has become the main object of all these investigations to achieve a more uniform distribution of the areas of differing thickness transversely to the direction of feed of the web.

It has already been suggested to oscillate the slot die or one of the subsequent stations, e.g. the winding device, at a suitable amplitude transversely to the direction of transport. In addition to the increased expenditure required on apparatus, this would also cause an increase in waste, due to the wider margin which would have to be cut off, because, in order to produce straight edges, at least the distance corresponding to the lateral shift would have to be cut off at each side.

The transverse stretching of webs of plastic film is well known. For this purpose, the edges of the extruded crude film are gripped by holding elements, normally clips, and conducted from a certain point in such a manner that the paths of the two edges diverge by the same amount. The divergence of the transverse stretching frame causes the desired stretching ratio, which may be adjusted to suit a particular material and/or application of the end product. During the transverse stretching process, the web of film becomes thinner and the differences in thickness are also altered in accordance with the stretching ratio, but, when seen as a whole, the differences in thickness, although less marked, are retained, and the thicker areas are superimposed when the film is wound up, thus causing the above described disadvantages.

Besides transverse stretching, a longitudinal stretching is performed in many cases, processes for the simultaneous stretching in both directions—no longer usual nowadays—as also for stretching first in the longitudinal and then in the transverse direction, or for stretching first in the transverse and then in the longitudinal direction being known. Further, multi-stage stretching processes are known from the prior art. Although the process of the present invention is described herein with reference to a transverse stretching process, it may also be applied to the other stretching processes mentioned before.

SUMMARY OF THE INVENTION

It is an object of the present invention to provide a process by which, during transverse stretching, the flow lines and, consequently, the areas of different thickness are displaced to such an extent that they are no longer superimposed during the following winding process, so that the formation of bulges and the drawbacks caused thereby are avoided. Thus, what was aimed at was something resembling a "blurring" of the flow lines. Another object of the present invention was to reduce the absolute difference between positive or negative deviations in thickness from a medium web thickness, i.e. to improve the uniformity of the web profile, which is of particular importance for the further processing of the film.

The object of the present invention is achieved by a process for the transverse stretching of webs of plastic film in which the edges of the web are continuously held by holding elements while the web is being transported in the longitudinal direction, which process is characterized in that, from a certain point A onwards, one of the edges of the web is guided for a stretch S on a diverging path, relative to the longitudinal axis of the web, whereas the other edge of the web is not diverged within this stretch, or is guided along a diverging path for a stretch $S_1$ from a point B onwards, which, with respect to the longitudinal axis of the web, is displaced from point A, and that, after a predetermined stretch, the edge on the opposite A'-side of the web is guided correspondingly, but beginning from a point which is displaced in the direction of the web with respect to the first transverse stretching.

As shown by the examples described herein, the process of the invention results in a considerable improvement as regards a displacement of the flowlines and thus more favorable winding characteristics, as also as regards an absolute reduction of the differences in thickness. The films manufactured by the process of the invention displayed also considerable improvements when the finished rolls were subsequently stored, as is normally the case. When webs of film manufactured by a transverse stretching process known from the prior art, with uniform divergence, are wound up and/or stored, they very soon show distortions due to superimposed thicker areas, on the one hand, and, on the other hand, folds and creases in the thinner areas. Even after a short storage time, an optical inspection of such rolls shows a wrinkled structure, a sure indication of inferior quality to the processor. Rolls of films which had been transversely stretched according to the process of the invention show a smooth appearance even after a relatively long time of storage, so that an improved quality can already have been concluded by having a look at them.

Practical measuring tests of the wound up rolls show that the frequency of faults in the wound up roll, judging from the measurable bulges and indentations, is effectively reduced to about 40%, in the case of some materials and thicknesses of film even to 10%, of that of prior art films.

Moreover, it was found that films which had been transversely stretched in accordance with the invention could be wound up much more tightly than webs of conventional film, without the rolls showing the above described drawbacks, a fact which per se is an advantage. A winding density of 1.00, which means that the individual layers of the roll are superimposed without any layers of air between them, is to be regarded as the absolute value. In the transverse stretching processes used in the past, a value of about 0.93 had been determined as the lower limit for winding up webs of film. Below this value, the roll begins to skew. The average range attained by special winding techniques is at a winding density of 0.94 to 0.97. Hitherto, it has not been possible to wind webs of films at densities above 0.97, because this resulted in distortions, especially in the thicker areas of the film. Films produced according to the present invention, however, can be wound up to a density of winding of 0.98 to 0.99. This fact can be regarded as a considerable improvement in the art, because it is desirable to wind the rolls as tightly as possible in order to reduce to a minimum the layers of air between the film layers, since air layers escaping in the course of time tend to disturb the structure of the roll.

Besides the simple, asynchronous transverse stretching according to the invention, the process of the invention is preferably conducted in such a manner that the web is repeatedly guided along an asynchronously diverging path.

Although it is not absolutely necessary, it has been found that particularly favorable results are obtained when the asynchronously diverging guiding of the web is such that the divergences are geometrically identical.

In a particularly favorable variation of the present process, the divergence is periodically displaced, a periodic displacement in the direction of the longitudinal axis of the web (FIG. 4) as also in the direction transverse to this axis (FIG. 5) being possible. In this manner, the web of material entering the stretching zone is additionally subjected to a constantly varying distribution of the longitudinal and transverse forces acting upon it.

The expression "periodic displacement in the direction of the longitudinal axis of the web" means that the beginning of each divergence is moved to and fro in the direction in which the web is transported (see FIG. 4). In an apparatus adapted for performing such a process, the divergingly conducted holding elements, e.g. freely running clips, are guided within the diverging zone, and especially in the overlapping zone, in double rails, one rail being periodically displaced each time. Within these zones, the guide rails are bisected in their longitudinal direction, e.g. at the level of the web of material, and movable with respect to each other by means of independently mounted holders which, in turn, are connected to longitudinal slides, whereas the clips run in two guide pulleys one of which engages a bisected guide rail, the clips being guided by one guide pulley when one of the bisected guide rails is moved from a rear position into an advanced position. Suitable means for such displacement are, e.g., pneumatically or hydraulically operated connecting rods, motor-driven drag chains, or other known devices.

The expression "periodic displacement transversely to the longitudinal axis of the web" means that the diverging web guide is bent to and fro within a predetermined area (see FIG. 5). In an apparatus suitable for performing this process, the holding means, e.g. clip rails, are provided with bending points which enable the web guide to change its path periodically transversely to the direction of feed of the web. Bending is likewise performed by known means, such as connecting rods, motors etc.

In these last-described variations of the process, it has proved to be advantageous to perform a periodic displacement on both sides in order to achieve particularly favorable results.

Although it is possible for the web to be guided on any desired path and with different angles of divergence, as long as the requirement for an asynchronous divergence is fulfilled, it has proved to be of particular advantage, also for reasons of apparatus, for the divergence to take place within a straight section, i.e. to have the holding elements grip the film edges in a straight line.

The process of the invention may be applied to all flat sheets of film in which it is of importance to avoid distortions and to achieve a particularly high degree of uniformity of thickness.

Plastic films of polyolefines and polyesters, in particular very thin films of a thickness from $50\mu$ to about $2\mu$, are preferably stretched in the transverse direction by the process of the invention.

Films in which a uniform thickness is of especial importance are used mainly for electroinsulating purposes, for recording tapes, and for data processing.

The following table shows, by way of example, the improvements caused in polyester film by the process of the invention, without limiting the present invention to the selection given in the table.

TABLE

|  | Prior art process, using a symmetrically diverging frame | Process according to the invention | Prior art process | Process according to the invention |
| --- | --- | --- | --- | --- |
|  | I | II | III | IV |
| A. Parameters of the process: |  |  |  |  |
| 1. Material | ¹PET | ¹PET | ¹PET | ¹PET |
| 2. Thickness of web ($\mu$) | 12.0 | 12.0 | 6.0 | 6.0 |
| 3. Rate of Feed (m./min.) | 90 | 90 | 90 | 90 |
| 4. Width of web prior to stretching (mm.) | 575.0 | 575.0 | 575.0 | 575.0 |
| 5. Width of web after stretching (mm.) | 2,000.0 | 2,000.0 | 2,000.0 | 2,000.0 |
| 6. Width of roll (mm.) | 1,500 | 1,500 | 1,500 | 1,500 |
| 7. Length of web wound up (m.) | 7,000 | 7,000 | 7,000 | 7,000 |
| 8. Number of layers on the roll | 8,000 | 8,000 | 9,000 | 9,000 |
| 9. Tension during winding (kg.) | 12.0 | 12.0 | 8.0 | 8.0 |
| 10. Transverse stretching ratio | 1:3.5 | 1:3.5 | 1:3.5 | 1:3.5 |
| 11. Amplitude of displacement of divergence (mm.) |  | 2,000 |  | 2,000 |
| 12. Period of displacement of divergence (sec.) |  | 60 |  | 60 |
| 13. Phase displacement of divergence (<°) |  | 180 |  | 180 |
| B. Parameters of the film: |  |  |  |  |
| 14. Positive deviation from average thickness of the longitudinal streaks (+) (mm.) | 0.0005 | 0.00015 | 0.0004 | 0.0001 |
| 15. Negative deviation from average thickness of the longitudinal streaks (−) (mm.) | 0.0004 | 0.00015 | 0.0003 | 0.0001 |

TABLE—Continued

|  | Prior art process, using a symmetrically diverging frame | Process according to the invention | Prior art process | Process according to the invention |
| --- | --- | --- | --- | --- |
|  | I | II | III | IV |
| 16. Total difference (+) + (−) (mm.) | 0.0009 | 0.0003 | 0.0007 | 0.0002 |
| 17. Height of bulge in area of increased thickness (mm.) | 4.0 | 1.1 | 3.6 | 0.6 |
| 18. Depth of necking in area of reduced thickness (mm.) | 3.2 | 0.8 | 2.7 | 0.4 |
| 19. Difference (+) from average diameter of the wound up roll (mm.) | 8.0 | 2.2 | 7.2 | 1.2 |
| 20. Difference (−) from average diameter of the wound up roll (mm.) | 6.4 | 1.6 | 5.4 | 0.8 |
| 21. Total difference between two neighboring areas of reduced and increased thickness on the roll surface (mm.) | 7.2 | 1.9 | 6.3 | 1.0 |
| 22. Total difference between minimum and maximum diameter of the roll (mm.) | 14.4 | 3.8 | 12.6 | 2.0 |

1 Polyethylene terephthalate.

The values stated in the table above are average values determined from a number of film webs. The films were extruded from a slot die, heated to stretching temperature, and then transversely stretched according to the invention (II, IV), with the divergence being periodically displaced in the direction of the longitudinal axis of the web, as can be seen from numerals 11 to 13.

Further tests have shown that the parameters stated in the table referring to the characteristics of the process of the invention can be varied within a wide range and adapted to the requirements of a particular case. First, the amplitude of the periodic displacement of the transverse stretching may have any desired value between 0.1B (B=width of the transversely stretched web) and 4B. For favorable results, however, it is recommended to select an amplitude between 1 and 1.5B.

The frequency of the alternating motion depends in the first line on the quality, the strength (forces opposing stretching), and the other characteristics of the web of flat plastic film. Therefore, it is of advantage to maintain a certain relation to the feed speed of the web of material, which normally is predetermined by the prevailing conditions. The average rate of the alternating motion (i.e. of the periodic displacement of transverse stretching) may be within the range of 0.05 to 50% of the feed speed of the web of material. Good results are obtained at a rate of 4 to 5% in the case of polyester films. The corresponding value stated in the examples is 4.45%.

As the third essential parameter of the process of the invention, the phase displacement of motion has to be explained. The phase displacement may be between 1 and 180°. It will be obvious, however, that a value of 180° has certain undeniable advantages (such as zero point determination, adjustment, easier handling and switching of the apparatus used for the process of the invention). In the described Examples a displacement of 180° was likewise used.

From what is said above, it will be obvious that, independently from the frequency, the amplitude and the phase displacement of the motion, the asynchronous stretching may be interrupted at any point of the motion cycle by periods of any desired length during which no stretching takes place.

As can be further seen from the table, the parameters of the film (14–22) are considerably improved by the process of the invention, both as regards the differences in thickness (14–16) as well as regards displacement (blurring) of the flow lines (17 and 18), which means that the quality of the web of film is substantially increased.

In the following, the invention will be further illustrated by reference to the attached drawings, without limiting it to the embodiments shown in these drawings.

BRIEF DESCRIPTION OF THE DRAWINGS

In the accompanying drawings

DETAILED DESCRIPTION

Figure 1:
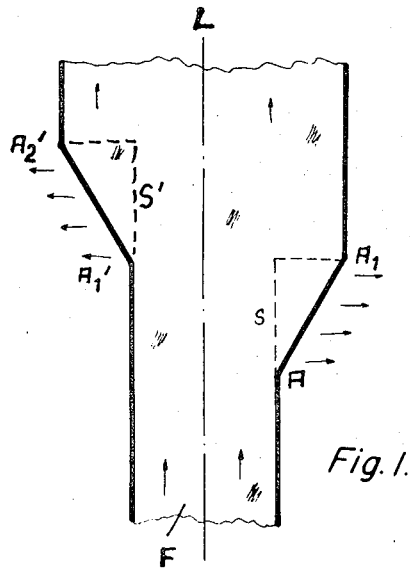
FIGS. 1 to 5 are diagrams respectively illustrating the manners in which the web is guided and stretched, e.g. either in freely running clips or in clips connected by a chain, in five exemplary embodiments of the invention.

Referring to a first embodiment of the invention:

FIG. 1 shows how the web of film F is divergently conducted in the direction of the longitudinal axis L (see arrows) for a stretch S between points A and $A_1$, whereas the left edge of the web is guided without divergence. Starting from point $A_1$, it is then the right-hand side of the web which is conducted without divergence, whereas the left-hand edge is divergently conducted for a stretch S′ between the points $A_1'$ and $A_2'$. The arrows transversely to the direction of feed indicate the transverse stretching forces.

Figure 2:
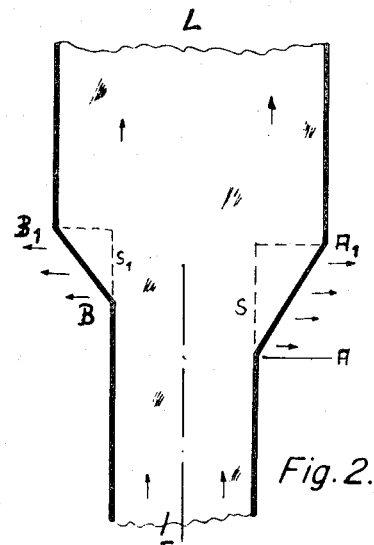

FIG. 2 shows another embodiment of the invention. In this case, the right-hand edge of the web is divergently conducted along a stretch S between the points A and $A_1$, whereas the left-hand edge is conducted part of this stretch without divergence. Between the points B and $B_1$, the left-hand edge of the web is also guided along a stretch $S_1$ but also in this case the asynchronous divergence according to the invention can be recognized.

Figure 3:
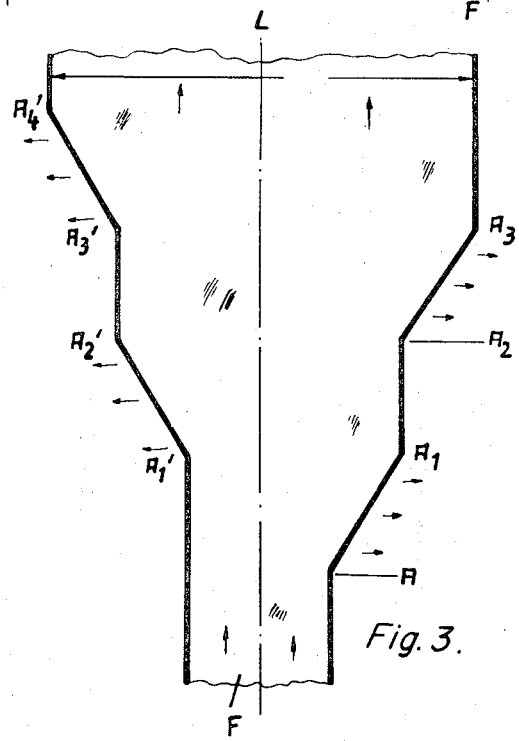

FIG. 3 shows a succession of transverse stretching steps according to the invention, between the points $A–A_1$, $A_2–A_3$, $A_1'–A_2'$, and $A_3'–A_4'$.

Figure 4:
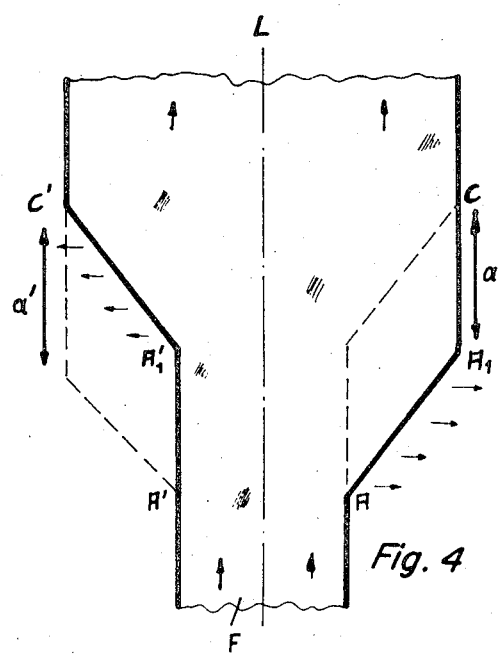

FIG. 4 shows the transverse stretching process of the invention with a periodic displacement in the direction of the longitudinal axis L of the conveyed web of film F. In this case, the guiding of the web is periodically displaced in the direction of the arrows a and a′ at the right-hand edge of the web, between the points A, $A_1$ and C, and at the left-hand edge between the points A′, $A_1'$, and C′. In a preferred embodiment, the periodic displacement is performed simultaneously at both edges, in phase-displaced directions.

Figure 5:
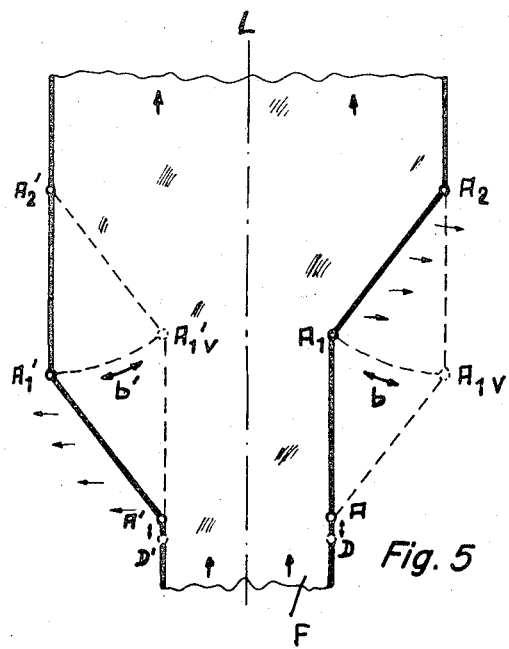

FIG. 5 shows the other embodiment of the periodic displacement, i.e. transversely to the longitudinal axis L of the conveyed film web F. In this case, the path along which the web is guided is bent in the direction of the arrows b and b′, with point $A_1$ at the right edge of the web being displaced to point $A_{1v}'$, and point A′ at the left edge being displaced to point $A_{1v}'$. Since bending causes also a reduction in length, a movement from A–D to A′–D′ is simultaneously performed, which of course, may also take place in points $A_2$ or $A_2'$.

As can be seen from these figures, several variations and modifications of the inventive process are possible, and, as already stated, multi-stage stretching processes and simultaneous transverse/longitudinal stretching processes are also included within the scope of the invention.

I claim:

1. A method for the transverse stretching of a web of a plastic film asymmetrically with respect to each side edge thereof while moving the web in a substantially straight, longitudinal direction comprising advancing a continuous length of said film longitudinally, continuously engaging each side edge of said film during its longitudinal movement with gripping means, divergent guiding by said gripping means a given longitudinal area of one edge of said film in an outwardly diverging path for a given longitudinal distance to cause transverse stretching thereof while the corresponding longitudinal area of the opposite edge of the film is not guided out in a diverging path symmetrical with the diverged longitudinal area of the first other edge of said film, said divergent guiding being periodically displaced in either the direction of the longitudinal axis of the film or in a direction transverse to the longitudinal axis of the film, and thereafter guiding said diverged given longitudinal area of the first edge of said film in a straight, longitudinal non-diverging direction for a given longitudinal distance whereby the distribution of the flow lines of the film web is improved and the difference in thickness within the film web is reduced.

2. A method according to claim 1, characterized in that the guiding of the web which causes the transverse stretching is repeated several times at intervals.

3. A method according to claim 1, characterized in that the divergent guiding of the web is periodically displaced on both edges of the web.

4. A method in accordance with claim 1 wherein a given longitudinal area of the said opposite edge of the film is guided by said gripping means in an outwardly diverging direction for a given longitudinal distance asymmetrically with the diverged longitudinal area of the first other edge of the film and thereafter guided in a straight, longitudinal direction for a given distance.

5. A method in accordance with claim 4 wherein the asymmetrically diverged longitudinal areas of each side of the film are substantially geometrically equal.

6. A method in accordance with claim 1 wherein a given longitudinal area of the said opposite edge of the film is guided by said gripping means in a straight, longitudinally extending direction for at least a portion of the distance the other longitudinal edge of the film is being guided outwardly in a diverging path and said given longitudinal area of said opposite edge is thereafter guided outwardly in a diverging path for a given distance asymmetrical with any divergence of the other edge of the film.

7. A method in accordance with claim 1 in which the first one side edge of the film is guided out in a diverging path and then the other side edge of the film is guided out in a diverging path asymmetrically with the first path and the alternating guiding of the respective two sides of the web in diverging paths thereafter repeated.

References Cited
UNITED STATES PATENTS

| 3,172,151 | 3/1965 | Glossmann | 26—62 |
| 3,375,313 | 3/1968 | Zygan et al. | 264—289 |
| 3,350,491 | 10/1967 | Rasmussen | 264—289 |
| 2,505,146 | 4/1950 | Ryan | 264—289 |
| 3,370,111 | 2/1968 | Boone | 264—289 |

ROBERT F. WHITE, Primary Examiner

J. B. LOWE, Assistant Examiner

U.S. Cl. X.R.

264—288